United States Patent
Vasseur et al.

(10) Patent No.: US 9,628,362 B2
(45) Date of Patent: Apr. 18, 2017

(54) LEARNING MACHINE BASED DETECTION OF ABNORMAL NETWORK PERFORMANCE

(71) Applicant: Cisco Technology, Inc., San Jose, CA (US)

(72) Inventors: Jean-Philippe Vasseur, Saint Martin d'uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 13/955,860

(22) Filed: Jul. 31, 2013

(65) Prior Publication Data

US 2014/0222998 A1 Aug. 7, 2014

Related U.S. Application Data

(60) Provisional application No. 61/761,117, filed on Feb. 5, 2013.

(51) Int. Cl.
*G06F 15/173* (2006.01)
*H04L 12/26* (2006.01)
*H04L 12/24* (2006.01)

(52) U.S. Cl.
CPC ............ *H04L 43/10* (2013.01); *H04L 41/147* (2013.01); *H04L 41/16* (2013.01); *H04L 43/08* (2013.01); *Y04S 40/168* (2013.01)

(58) Field of Classification Search
CPC ....... H04L 43/10; H04L 41/147; H04L 41/16; H04L 43/08
See application file for complete search history.

(56) References Cited

U.S. PATENT DOCUMENTS

| 8,228,954 B2 | 7/2012 | Thubert et al. |
| 2005/0076054 A1 | 4/2005 | Moon et al. |

(Continued)

OTHER PUBLICATIONS

Bongard, et al., "Automated Reverse Engineering of Nonlinear Dynamical Systems", Proceedings of the National Academy of Sciences, Jun. 12, 2007, vol. 104, No. 24, pp. 9943-9948, Washington, DC.

(Continued)

*Primary Examiner* — Scott B Christensen
(74) *Attorney, Agent, or Firm* — Parker Ibrahim & Berg LLC; James M. Behmke; Stephen D. LeBarron

(57) ABSTRACT

In one embodiment, techniques are shown and described relating to learning machine based detection of abnormal network performance. In particular, in one embodiment, a border router receives a set of network properties $x_i$ and network performance metrics $M_i$ from a network management server (NMS), and then intercepts $x_i$ and $M_i$ transmitted from nodes in a computer network of the border router. As such, the border router may then build a regression function F based on $x_i$ and $M_i$, and can detect one or more anomalies in the intercepted $x_i$ and $M_i$ based on the regression function F. In another embodiment, the NMS, which instructed the border router, receives the detected anomalies from the border router.

22 Claims, 16 Drawing Sheets

(56) References Cited

U.S. PATENT DOCUMENTS

2012/0159459 A1 6/2012 Turner et al.
2013/0024560 A1 1/2013 Vasseur et al.

OTHER PUBLICATIONS

Schmidt, et al., "Distilling Free-Form Natural Laws from Experimental Data", Science, vol. 324, Apr. 3, 2009, pp. 81-85, American Association for the Advancement of Science, Washington, DC.

Ting, et al., "Efficient Learning and Feature Selection in High-Dimensional Regression", Neural Computation 22, 831-886, 2010, Massachusetts Institute of Technology.

Vasseur, et al., "Learning Machine Based Detection of Abnormal Network Performance", U.S. Appl. No. 61/761,117, filed Feb. 5, 2013, 39 pages, United States Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

El-Arini, et al., "Bayesian Detection of Router Configuration Anomalies", Proceeding of the 2005 ACM SIGCOMM Workshop on Mining Network Data, MINENET '05, Jan. 2005, 6 pages, ACM, New York, NY.

Fu, et al., "Network Anomaly Detection Based on Projection Pursuit Regression", 9th IEEE International Symposium on Parallel and Distributed Processing with Applications Workshops (ISPAW), May 2011, Institute of Electrical and Electronics Engineers, pp. 16-20, Institute of Electrical and Electronics Engineers, Busan, South Korea.

Pozzi, et al., "Notification of Transmittal of the International Search Report and the Written Opinion of the International Searching Authority, or the Declaration", Patent Cooperation Treaty, PCT/US2014/014706, mailed May 9, 2014, 13 pages, European Patent Office, Rijswijk, Netherlands.

Wang, et al., "On-Line Traffic Forecasting of Mobile Communication System", 1st IEEE International Conference on Pervasive Computing Signal Processing and Applications (PCSPA), Sep. 2010, pp. 97-100, Institute of Electrical and Electronics Engineers, Harbin, China.

A BAYESIAN NETWORK REPRESENTING THE JOINT PROBABILITY DISTRIBUTION OVER THREE RANDOM VARIABLES; X, Y, AND Z

BN FOR LINEAR REGRESSION

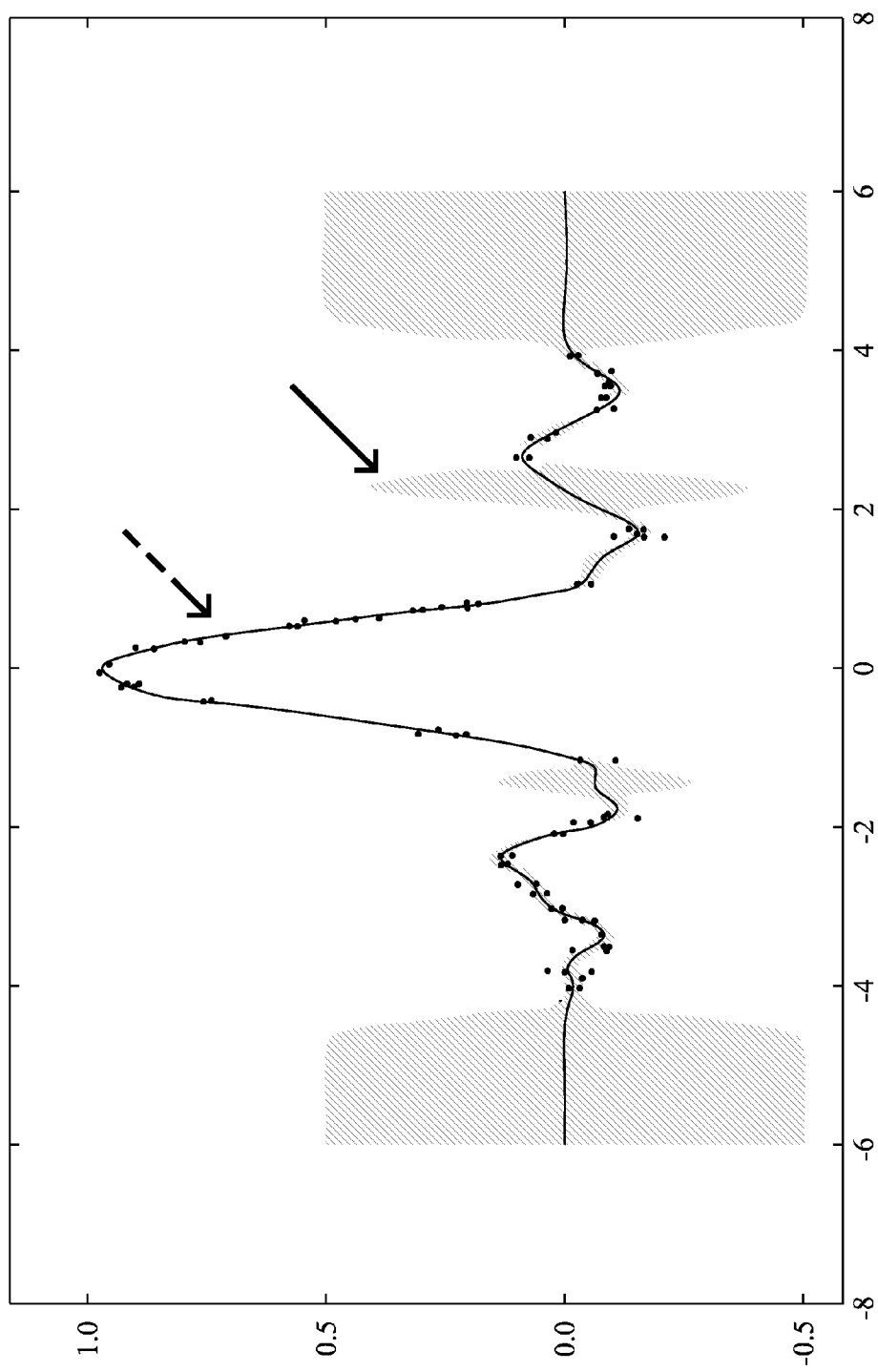

FIG. 10

REGRESSION USING VBLS-RVM, THE CORRESPONDING CONFIDENCE INTERVAL IS DEPICTED USING THE SHADED AREA. THE SOLID ARROW INDICATES A REGION OF LOW CONFIDENCE THAT WOULD REQUIRE MORE DATA POINT. AS A RESULT, ANY NODE LYING IN THIS REGION WOULD BE REQUIRED TO REPORT ITS JOINING TIME TO THE LM_d. CONVERSELY, REGIONS OF HIGH CONFIDENCE (DASHED ARROW) DO NOT REQUIRE ANY FURTHER MEASUREMENT.

FIGURE:
OVERALL LM ARCHITECTURE
PROTOTYPE IMPLEMENTATION

LEARNING MACHINE BASED DETECTION OF ABNORMAL NETWORK PERFORMANCE

RELATED APPLICATION

The present application claims priority to U.S. Provisional Application Ser. No. 61/761,117, filed Feb. 5, 2013, entitled "LEARNING MACHINE BASED DETECTION OF ABNORMAL NETWORK PERFORMANCE", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 10 illustrates an example regression graph.

DESCRIPTION OF EXAMPLE EMBODIMENTS

Overview

Figure 1:
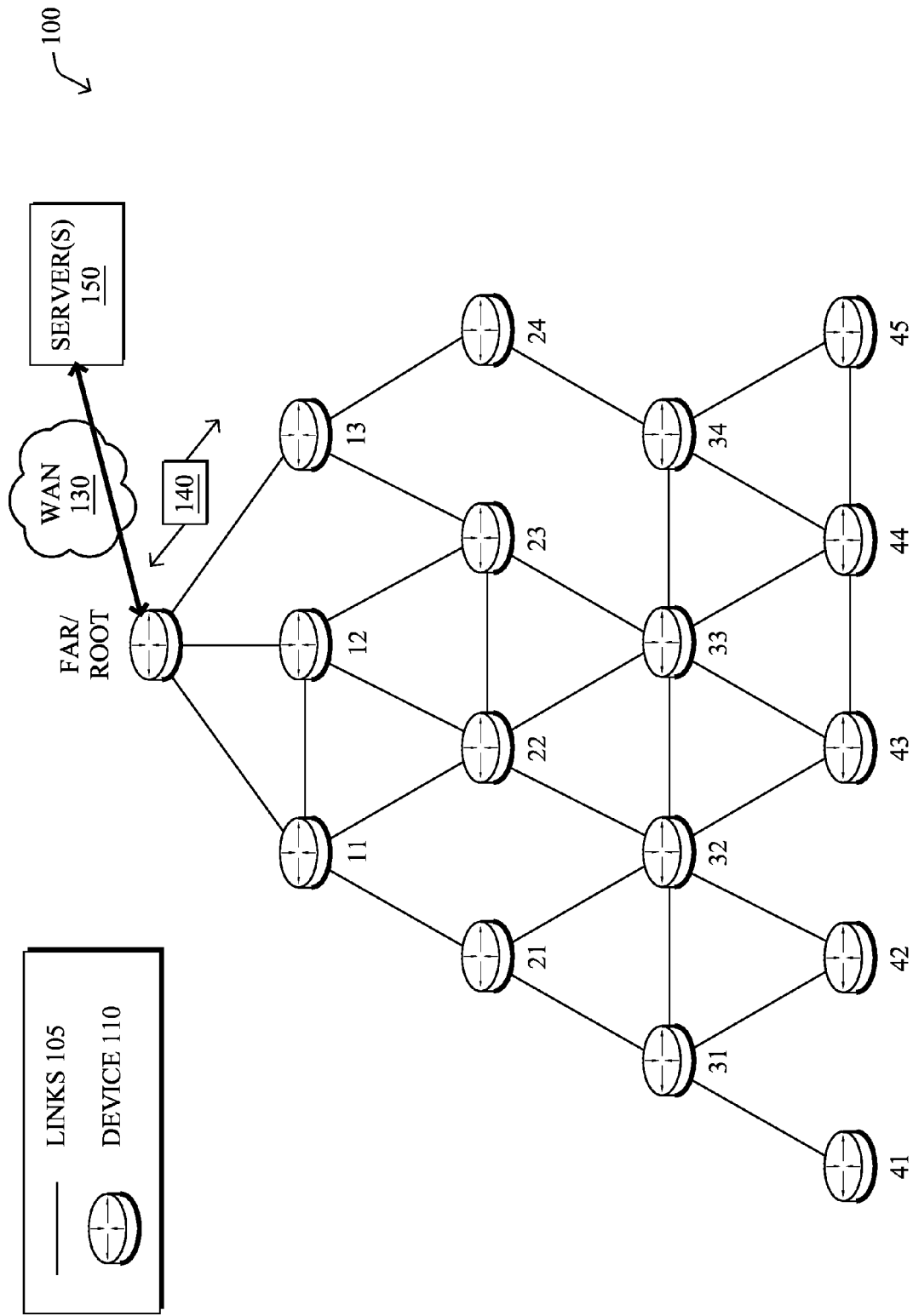
FIG. 1 illustrates an example communication network.

According to one or more embodiments of the disclosure, techniques are shown and described relating to learning machine based detection of abnormal network performance. In particular, in one embodiment, a border router receives a set of network properties $x_i$ and network performance metrics $M_i$ from a network management server (NMS), and then intercepts $x_i$ and $M_i$ transmitted from nodes in a computer network of the border router. As such, the border router may then build a regression function F based on $x_i$ and $M_i$, and can detect one or more anomalies in the intercepted $x_i$ and $M_i$ based on the regression function F.

In another embodiment, the NMS determines a set of network properties $x_i$ and network performance metrics $M_i$, sends them to a border router of a computer network, and receives, from the border router, one or more detected anomalies in intercepted $x_i$ and $M_i$ transmitted from nodes in the computer network based on a regression function F built by the border router based on $x_i$ and $M_i$.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," ... "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
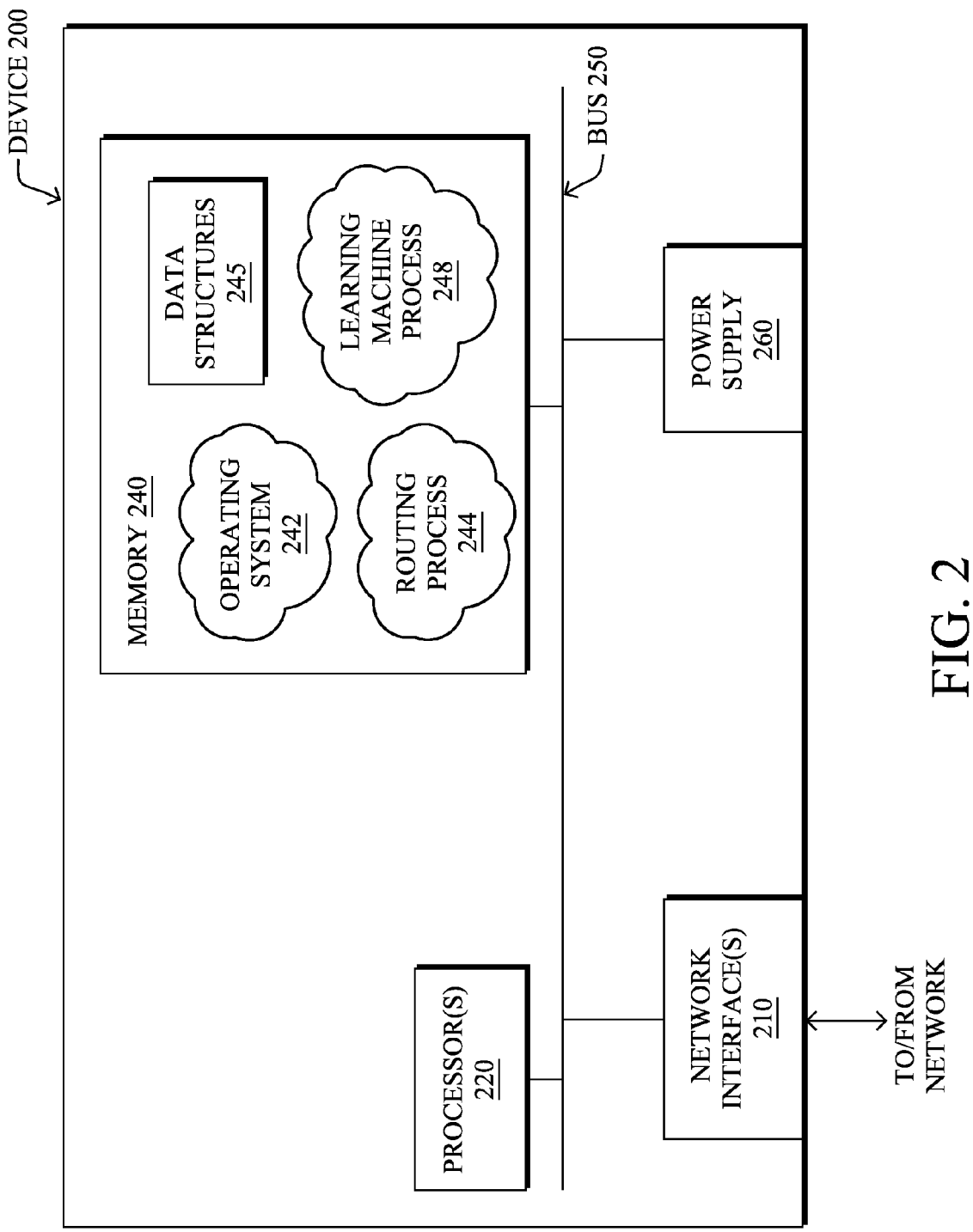
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
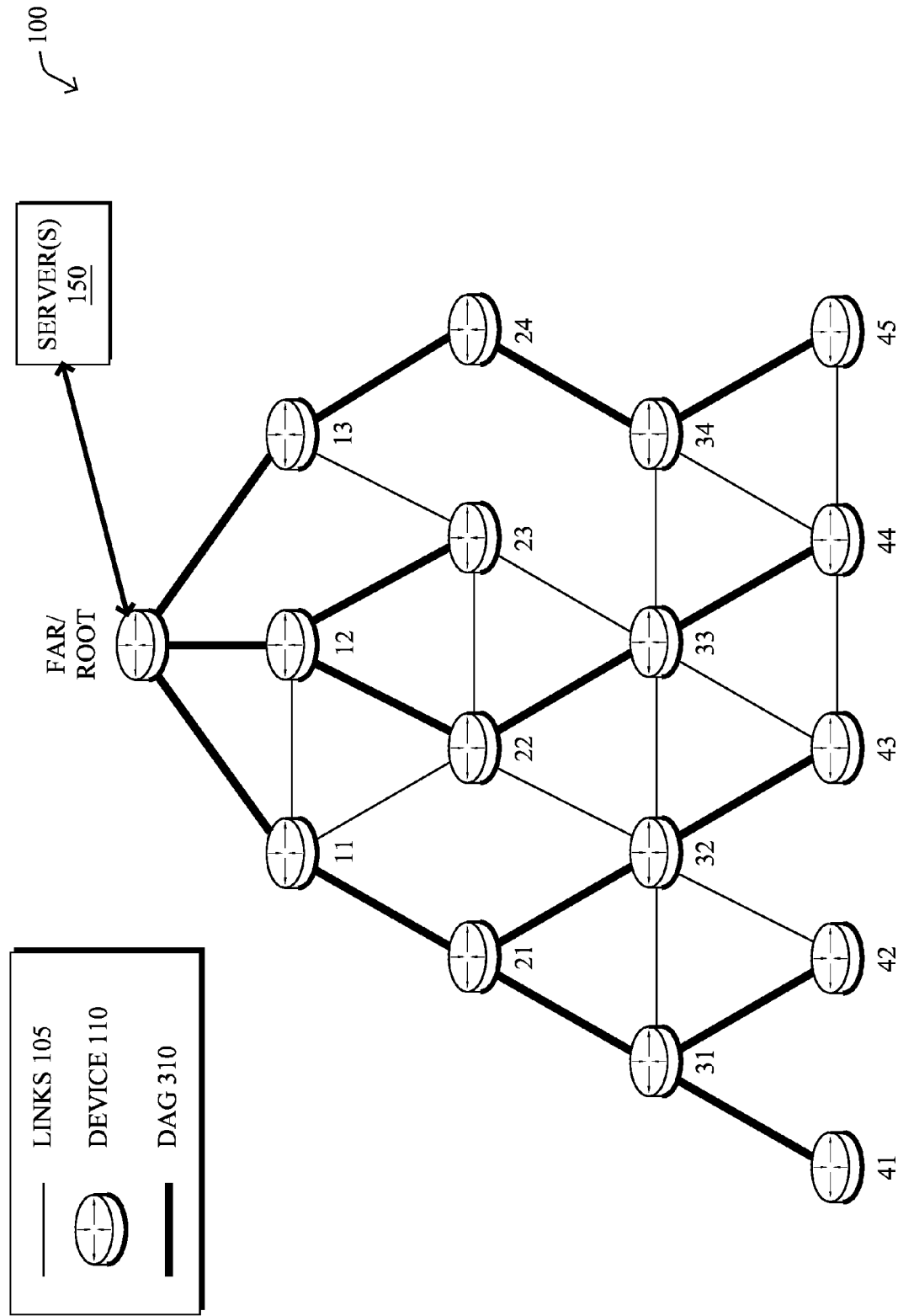
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+ b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad \text{(Eq. 1)}$$

Figure 4:
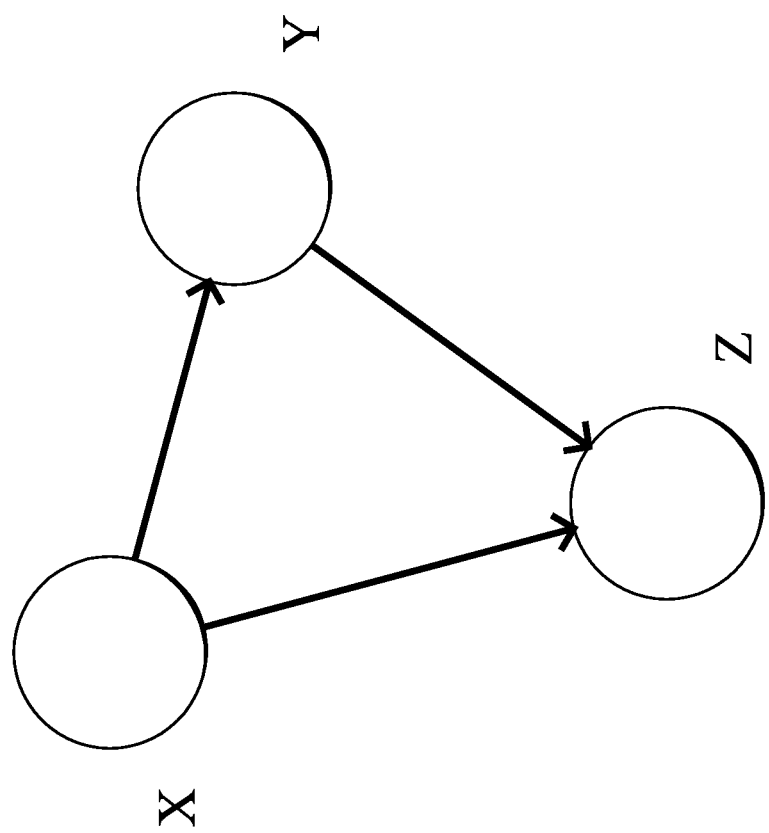
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\epsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$\text{MSE}=\Sigma_i(b^T x_i - y_i)^2/N \quad \text{(Eq. 3)}$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
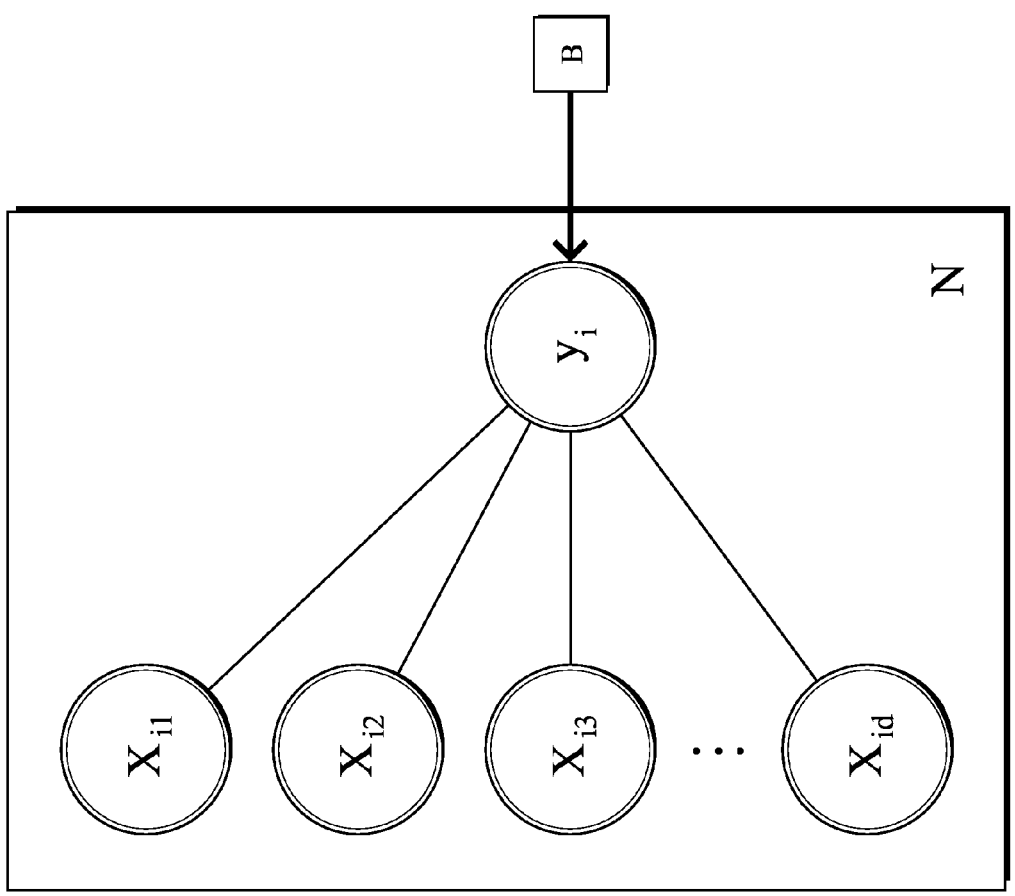
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior)

distributions of hidden parameters, which are set in an uninformative way, i.e., with very large variances that lead to flat distributions.

Another critical issue when estimating the mapping between $x_i$ and $M_i$ is that their relationship may be non-linear. Even in this case, one may use tools from linear regression such as VBLS: instead of performing the mapping between the raw data x and $M_i$, one may increase the dimensionality of the input space by extending it with non-linear transformations of the input data. These transformations may be called features, and are noted $f_j(x)$. These features $f_j(x)$ may be non-linear functions of one or more dimensions of x. Below are a few examples:

$$f_i(x) = x_i$$

$$f_{d+1}(x) = x_1 \cdot x_2$$

$$f_{d+2}(x) = \exp(x_1)$$

$$f_{d+3}(X) = x_1^3$$

$$f_{d+4}(x) = \log(x_1)$$

In this context, one may rewrite the linear regression as follows:

$$M_i = F(x_i) = \Sigma_j b_j f_j(x_i) + \epsilon \text{ for } j=1,2,\ldots \quad (\text{Eq. 4})$$

However, this approach poses one key challenge: there is an infinite number of possible features $f_j(x)$. As a result, even though VBLS has the ability to perform feature selection in an efficient way, the problem of exploring this infinitely large set of features is yet to be solved. Also, when considering only simply combinations of input dimension such as $f_1(x)=x_1 x_2$, $f_2(x)=x_1^2 \cdot x_2$, or $f_3(x)=x_1 \cdot x_2^2$, there is no guarantee that one can construct an accurate mapping $F(x_i)$, because there may be a need to incorporate non-integer powers of x (square roots, etc.) or more complex functions such as $\exp(\cdot)$, $\log(\cdot)$, or even trigonometric functions (e.g., $\sin(\cdot)$, $\cos(\cdot)$, etc.). This 'catalogue' of feature 'type' needs to be explored in a more or less intelligent way such that one can construct the most accurate mapping $F(x_i)$. Solutions to this problem range from a manual feature selection based on expert knowledge to automated exploration of the solution space using meta-heuristics.

Currently, techniques consist of: 1) statically configuring the set of relevant networking properties to monitor, using a management information base (MIB) with simple network management protocol (SNMP) or CoAP in the case of LLNs in order to monitor the network behavior and performance (e.g., routing, link loads); 2) retrieving all the information on the NMS; 3) analyzing one or more specific network performance metrics (referred to as $M_i$) such as the quality of service (QoS) or the time for a node $n_i$ to join the network; and 4) finding a correlation (e.g., based on 3) between the metric of interest $M_i$ and the properties of $n_i$ (noted $x_i$). Said differently, current techniques use a centralized approach to perform network monitoring and troubleshooting, constructing a model in order to evaluate a performance metric (e.g., the path delay) according to a set of monitored data (routing tree, link reliability, etc.).

Up to several years ago, 4) was performed manually by networking experts. With the increase in complexity of existing networks, it became required to use various techniques (analytics) to process a wide range of $x_i$ and perform correlation between a given set of $x_i$ and $M_i$. Such correlation is needed in order to build a network performance metric model, and determine whether $M_i$ is normal or abnormal, thus leading to root cause analysis. Note that root cause analysis is one of the main challenges in monitoring, troubleshooting, and configuring complex networks.

Figure 6:
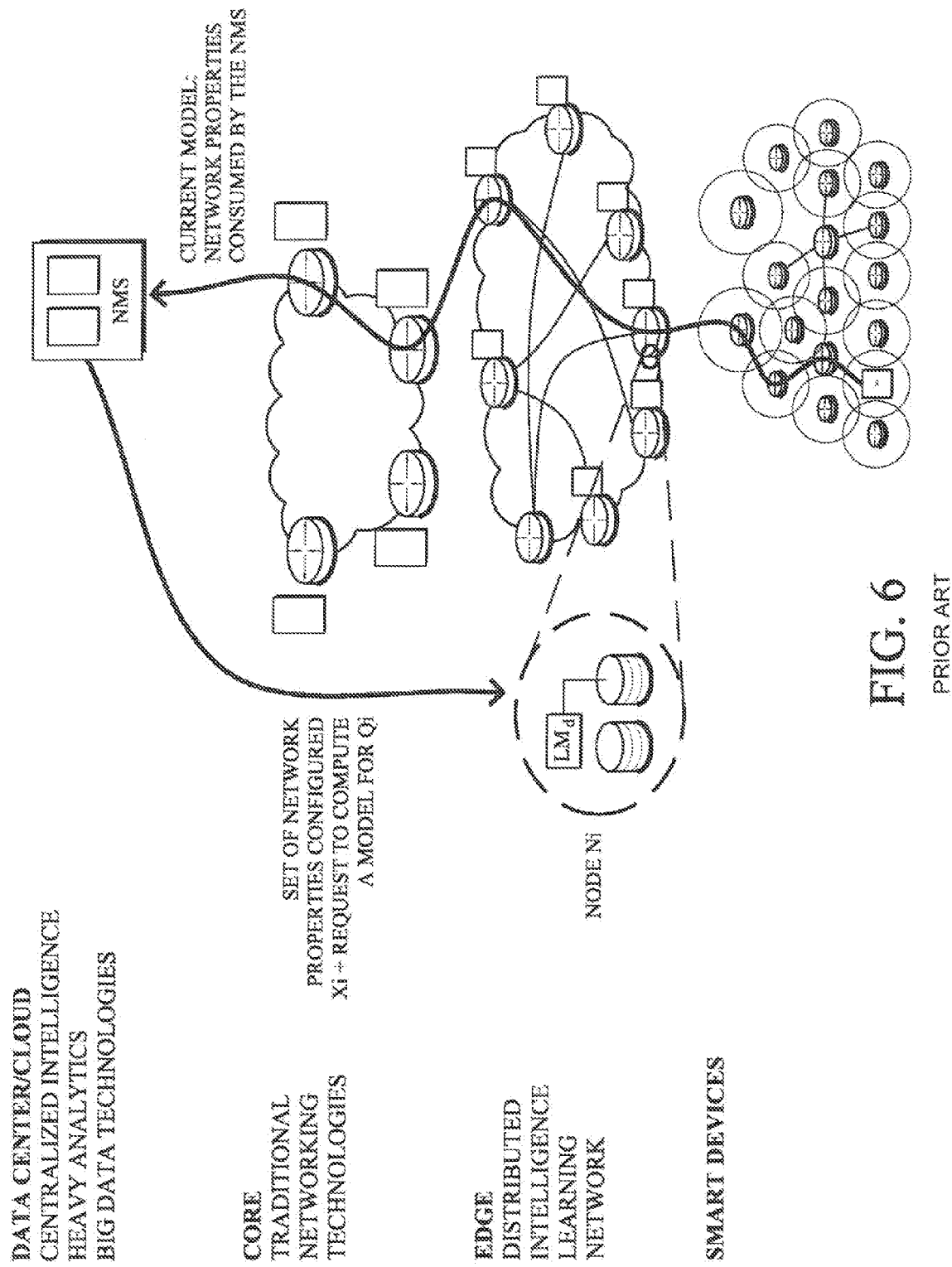
FIG. 6 illustrates an example learning machine network.

Unfortunately, the approach described above is ill-suited to LLNs; indeed the number of relevant networking properties is very large, making the static approach hard to implement and a "brute force" approach consisting of retrieving all possible $x_i$ is simply not possible because of the very limited bandwidth available at all layers between end nodes and the NMS in LLNs/IoT. This makes the current model not just ill suited to LLNs but generally not applicable at all. As a result, one can observe that in currently deployed LLNs, such as shown in FIG. 6 (illustrating an alternate view of network 100), a very limited number of $x_i$ are retrieved by the NMS, making the management of the network simply not possible (in terms of monitoring, troubleshooting, and even configuration).

The techniques herein, therefore, propose a distributed architecture, relying on distributed Learning Machines (named $LM_d$: Learning Machine Distributed) hosted on LBRs/FARs sitting at the fringe between the LLNs and the Field Area network (FAN) in order to build a model for $M_i$ using a modified sophisticated linear regression function $F(f_1(x_i), \ldots, f_m(x_i))$ where $f_j(x_i)$ are non-linear function called 'features' used to build the regression function F. Note that for the sake of illustration, M is the quality of services such as the path delay (called Q), but the techniques herein may be applied to a variety of other metrics such as the time for a node to join a mesh, the PAN migration frequency, etc.

Figure 7A:
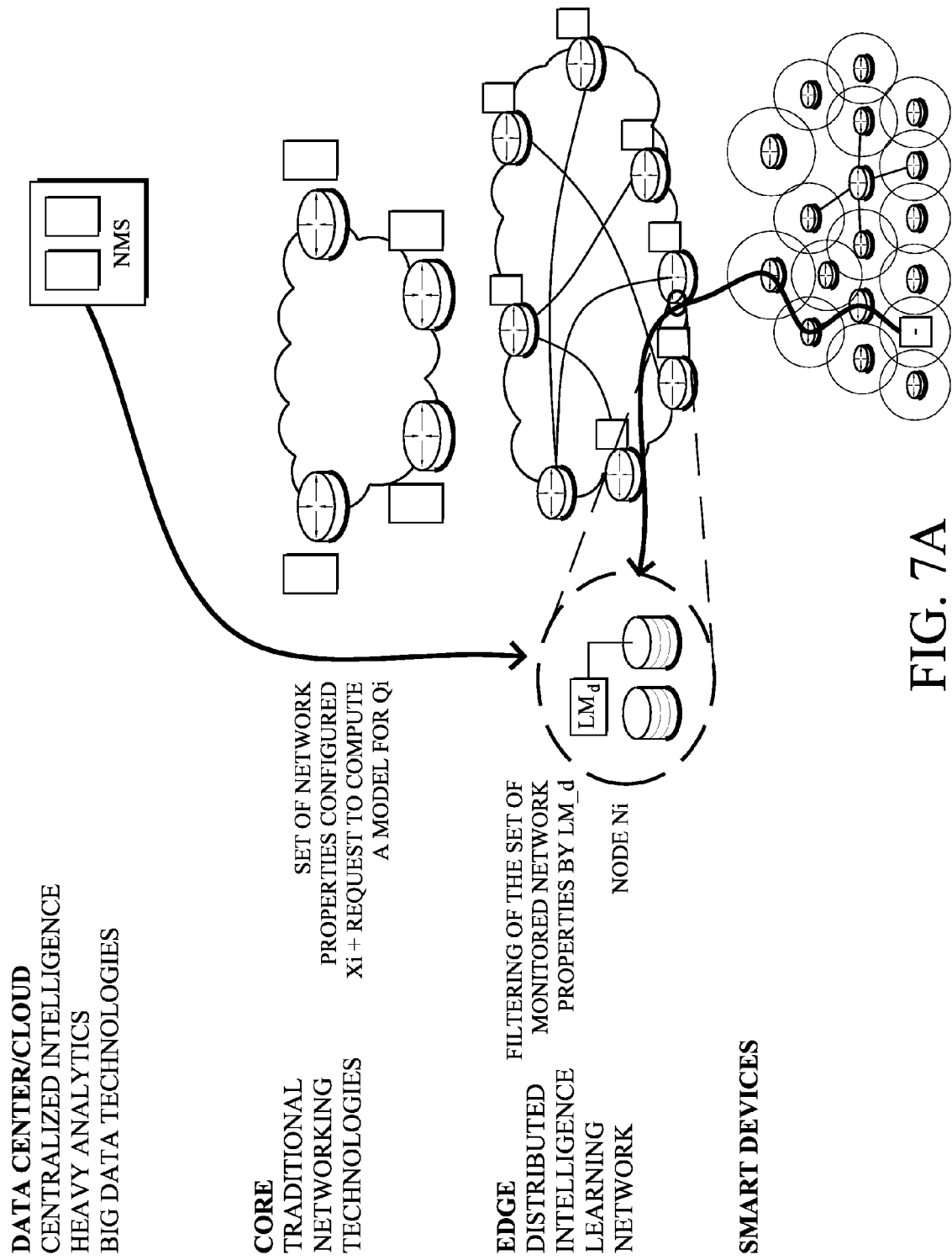
FIGS. 7A-7C illustrate an example learning machine network.
Figure 7B:
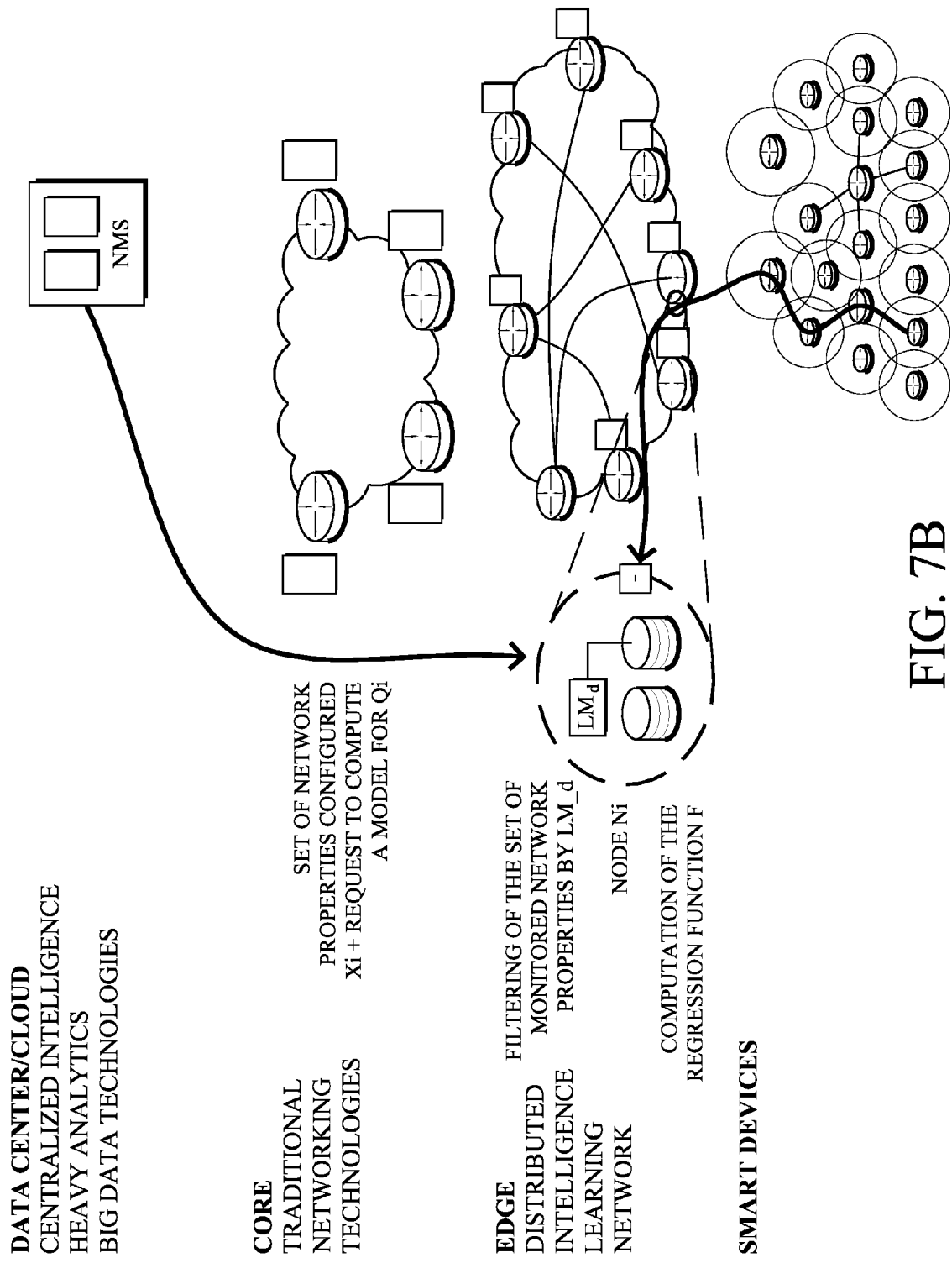
Figure 7C:
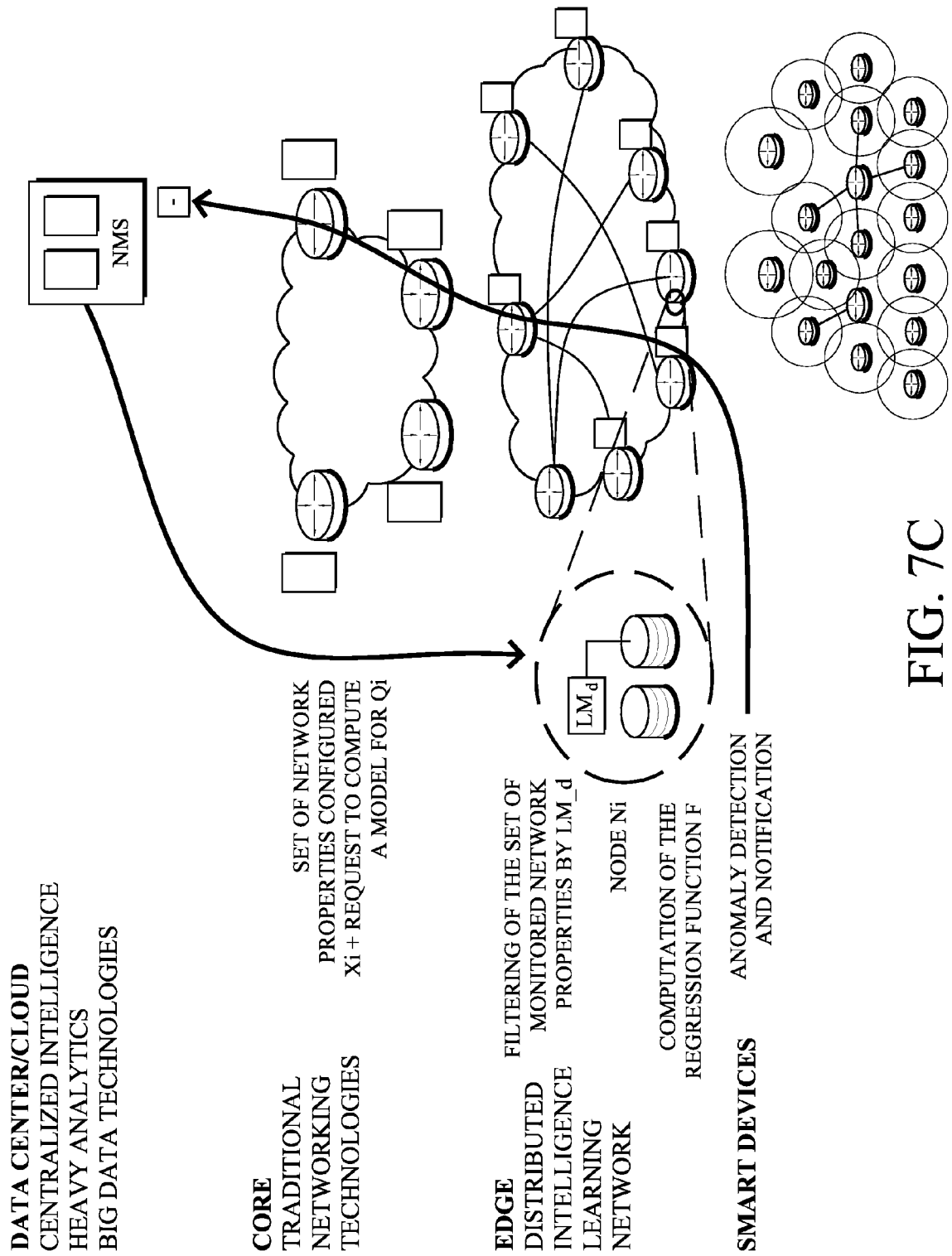

Said differently, the techniques herein make use of a distributed approach driven by the NMS consisting of using distributed learning machines hosted by Field Area Routers (FARs) that once informed of the network performance metric of interest locally intercept a set of network properties in order to build a regression function and detect anomalies. The techniques herein consist in 1) a collaborative interaction between the NMS and the learning machines (LMs) to notify the LMs of the metric of interest $M_i$ along with the set of monitored network properties ($x_i$), 2) the interception by the LM of the set of $x_i$ and the metric $M_i$ to build the regression function F and the novel modification of the VBLS algorithm to dynamically compute the optimal set of features f( ), 3) a technique for guiding the probing of $M_i$ so as to maximize the obtained information, 4) a technique for detecting anomalies based on the interval of confidence provided by VBLS, and 5) the reporting of the detected anomalies to the NMS. Generally, reference may be made to FIGS. 7A-7C for operation.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, a first component of the techniques herein relates to the interaction between the distributed learning machine ($LM_d$) hosted on the LBR (such as a Field Area Router) and the NMS. One of the tasks performed by the end user consists in configuring the set of network properties monitored using the CoAP protocol. Various techniques can be used to minimize the traffic generated for network monitoring in order for the NMS to populate its database with the network properties values $x_i$ (link load, link qualities, routing parameters to mention a few). The second parameter is the network performance M of interest (e.g., QoS, joining time, PAN migration, etc.), $M_i$.

The techniques herein specify a novel unicast IPv6 message used by the NMS to communicate both the set of $x_i$ and $M_i$; upon receiving the set of $x_i$ and $M_i$, in contrast with current approaches, the set of $x_i$ are intercepted by $LM_d$, thus reducing the overall control plane and network management traffic between the LBR and the NMS since the network properties are effectively consumed by $LM_d$.

The second component of this invention is the modification of the VBLS algorithm briefly described above. As already pointed out, in order to build the regression function F required to detect anomalies, the $LM_d$ needs to determine the list $L_{rel}$ of relevant features $f_j(x)$. At first, $L_{rel}$ is populated with the d basic linear features $f_j(x)=x_j$, $j=1, \ldots$, d, as well as a number of non-linear features that consist of two types of transformations of the raw input data: (1) product of various combinations of the input dimensions (e.g., $f(x)=x_1 \cdot x_2$ or $f(x)=x_1 \cdot x_3$) or (2) non-linear functions of the raw input (e.g., $f(x)=\exp(x_1)$ or $f(x)=\text{sinc}(x_1)$). In principle, one may also allow for a mixture of these transformations (e.g., $f(x)=\exp(x_1 \cdot x_2)$), or also including non-linear transformations of linear combinations of input dimensions (e.g., $f(x)=\exp(x_1+x_2)$). However, for most practical purposes, the two first options are sufficient (and it may allow for a dramatic reduction of the search space). To generate these features, the techniques herein use a feature construction (FC) algorithm that constructs new features in a random fashion, but tries to favor features of lower complexity (i.e., that involve fewer terms). This algorithm will be described in further detail below.

Once the list of features $L_{rel}=[f_1(x), \ldots, f_d(x)]$ is determined, one may use it as the input to a linear regression algorithm for determining $F(x)$. Note that d is often very large (in the order of several thousands dimensions or features) and many features may be collinear, thereby precluding the use of conventional linear regression strategies such as OLS. Further, the techniques herein aim to determine which features are irrelevant to the prediction of $M_i$ in order to remove them from $L_{rel}$, and added to a blacklist $L_{irr}$ (as irrelevant). The FC algorithm shall use $L_{irr}$ to restrict its search space in future iterations. As stated earlier, the techniques herein may use the VBLS algorithm to handle both the very high dimensionality of the input space and the presence of multiple collinear dimensions (notably providing an estimate of the relevance of each dimension).

The FC algorithm is a stochastic search algorithm that attempts to construct random non-linear features out of the basic input dimensions $x_1, \ldots, x_d$.

Figure 8:
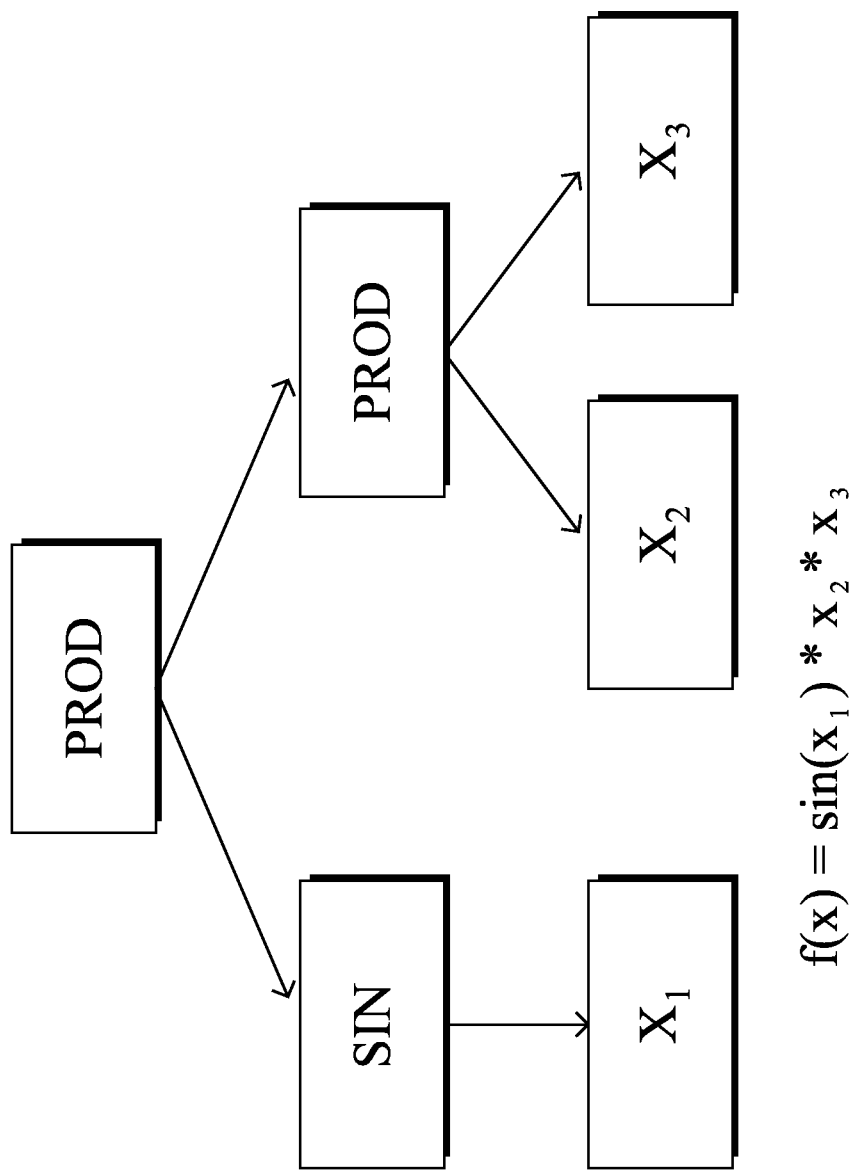
FIG. 8 illustrates an example feature tree.

In particular, a feature can be represented as a tree whose inner nodes are operators and outer nodes (also called leaves) are either constant values or input dimensions $x_1, \ldots, x_d$ (see FIG. 8). Operators are randomly selected from a user-defined catalogue obtained from the NMS, and they may be unary (non-linear functions as sin( ), sinc( ), exp( ), etc.) or binary (sum, subtraction, product, division, etc.). The techniques herein randomly generate features by using a hierarchical approach where trees are composed of a single inner node, but leaves may be other trees. Whenever a new feature must be generated, the techniques herein pick an operator at random (possibly with some bias for simple operators such as the product), and randomly select the operands either (1) from $L_{rel}$, with a probability that is proportional to their relevance $b_i$, or (2) from randomly generated operators.

The FC algorithm maintains a list of candidate solutions $[S_1, \ldots, S_N]$. Each candidate solution $S_i$ is a VBLS instance operating with a list of features $F_i$ constructed as above. All candidate solutions may be trained with the same raw input data, but each of them uses a different set of features. Upon creating a candidate solution, all its features are added to $L_{rel}$. At each iteration, their relevance (that is, the value $b_i$ computed by VBLS) is updated and the least relevant features are regularly pruned away from $L_{rel}$.

At regular (user-defined) intervals, the fitness of each $S_i$ (that is, a score that denotes the quality of $S_i$) is computed. Typically, the techniques herein use the ratio between the MSE yielded by a purely linear model and the MSE yielded by $S_i$ as fitness. Then, candidate solutions are randomly replaced by new solutions (generated as described above) with a probability that is inversely proportional to their fitness. Optionally, one may use a so-called 'elitist' scheme in which the best solution is never replaced. Using such an iterative approach, the techniques herein explore the solution space (by constructing random non-linear features) while focusing on promising solutions (by (1) re-using most relevant features from $L_{rel}$, and (2) use of a survival-of-the-fittest strategy).

Figure 9:
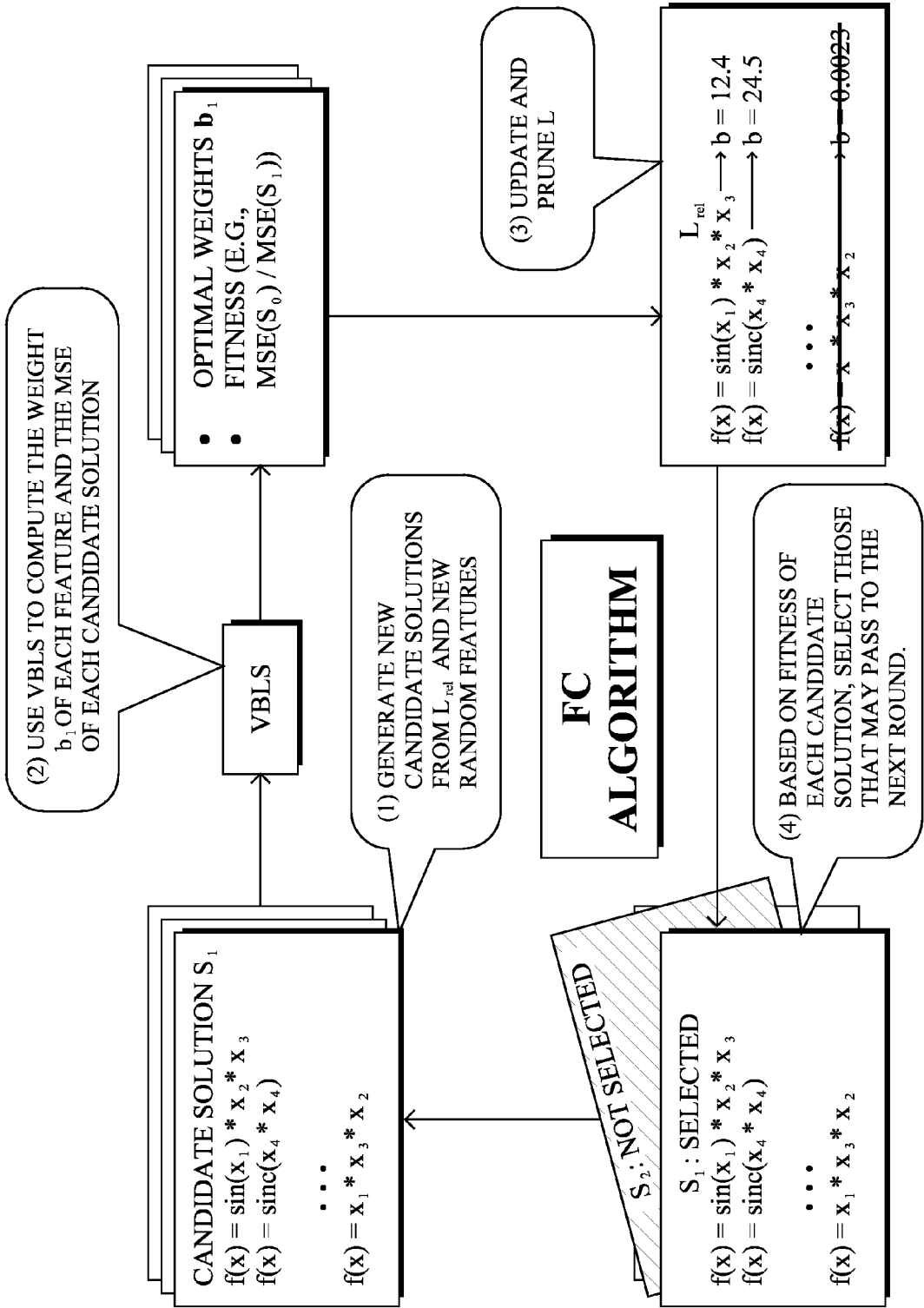
FIG. 9 illustrates an example learning machine architecture.

The overall approach, generally illustrated in FIG. 9, makes use of a conventional co-evolutionary approach with enhancements and modifications. Indeed, instead of attempting to evolve the whole regression function, the techniques herein divide the problem into the evolution of the functions and their building blocks (the features). Because the techniques herein rely on VBLS for determining the optimal weights of the latter, the techniques can achieve an important reduction of the search space as compared to the original approach. First, the algorithm simply looks for optimal combinations of features, and VBLS plays the role of determining their relevance. Second, because the building blocks are, by definition, simpler than the whole regression function, the corresponding search space is significantly smaller.

A third component of the techniques herein is a strategy for guiding the probing of $M_i$ in a nearly optimal fashion. The techniques herein help the FC algorithm to distinguish between the various candidates solutions $S_1, \ldots, S_N$. In particular, to this end, the techniques probe those nodes $n_j$ that yield the maximal divergence in terms of prediction of $M_i$ among all candidate solutions. More specifically, for each node $n_j$ with properties given by $x_j$, the techniques compute the vector $M^i=[M^i_1, \ldots, M^i_N]$ composed of the estimates of M for each candidate solution $S_1, \ldots, S_N$, and their variance $\sigma_i$ (optionally, the techniques may compute the weighted variance that would account for the fitness of each candidate). The next node to be probed is the one that maximizes this variance, because it is expected to disprove as many of the models as possible, and therefore to accelerate the selection process.

A fourth component of the techniques herein is the anomaly detection itself, using the computed regression function F. Because VBLS provides an interval of confidence on the estimate $M_i$ (see FIG. 10), that is, an interval $[M_{i,x\%}, M_{i,(100-x)\%}]$ that captures the expected extrema of (100−2·x)% of the nodes, outlier detection can be easily achieved by verifying that any newly measured metric $M_i$ is indeed within this interval.

A fifth component of the techniques herein is the specification of a newly defined IPv6 message sent by the $LM_d$ of a FAR to the NMS, in order to provide the computed regression function of $M_i$. Such a function can then be used on the NMS in order to visualize the relationship between various node properties and the metric of interest $M_i$. For example, one may observe the dependency between latency and hop count in a typical LLN, or the model can be used to show the direct dependency between the end-to-end path reliability and the location of the nodes in the network, or the influence of the number of nodes on the overall latency or jitter. This information can then be used by the end user to compute the probability of meeting specific SLAs knowing other network attributes (e.g., if the QoS (e.g. path delay) is a function of the rank node, link quality and node type; knowing the routing topology, it becomes possible to compute the number of nodes that will be reached in less than X ms (SLA)). Moreover, the network administrator may be able to detect anomalies, and but take actions to fix performance issues in the network.

Figure 11:
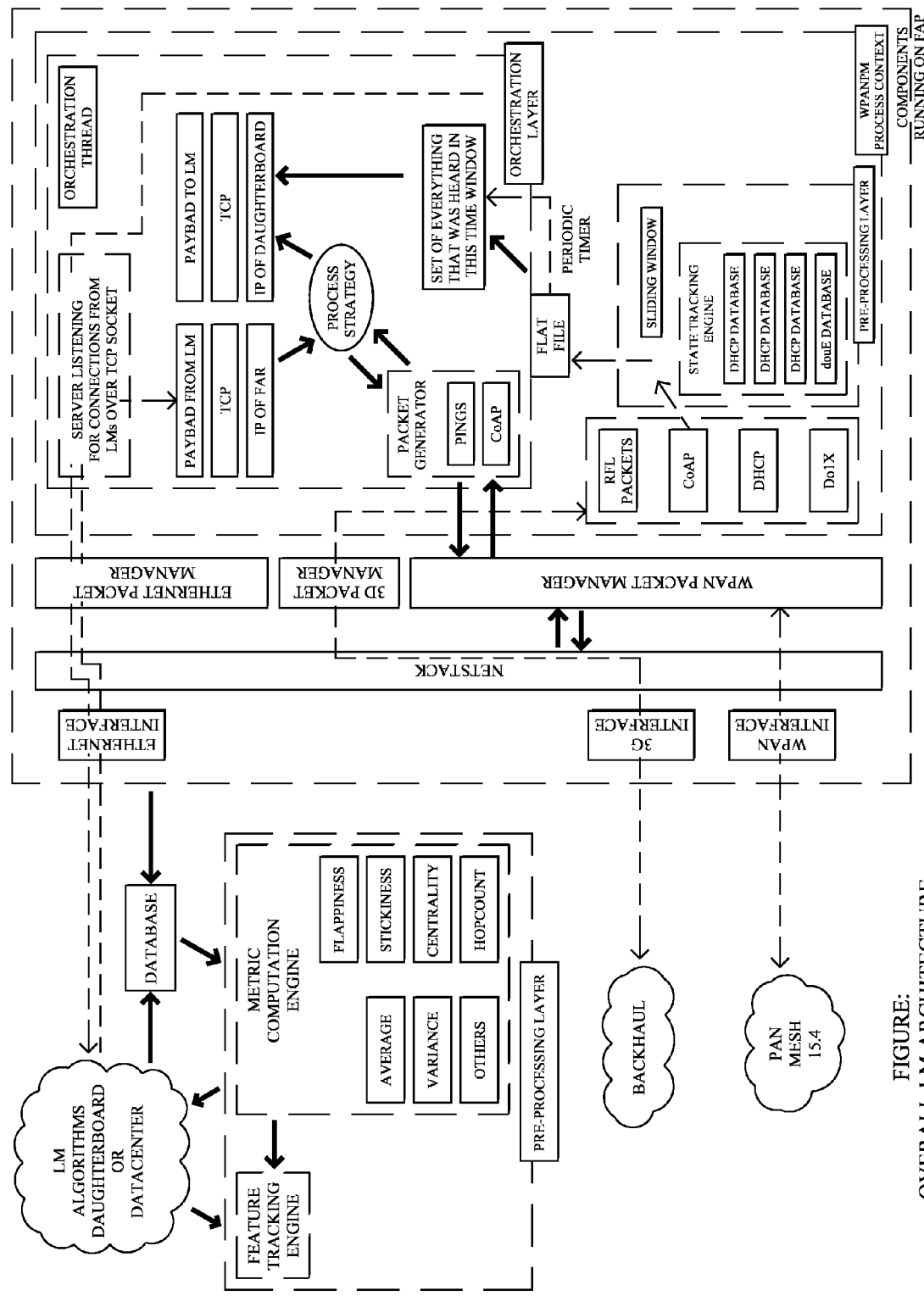
FIG. 11 illustrates an example learning machine architecture implementation.

Notably, an overview of the implementation of this architecture is illustrated in FIG. 11. The implementation consists of several logical components: the Pre-Processing Layer (PPL), the Orchestration Layer (OL) and the Learning Machine (LM) module itself.

1. Pre-Processing Layer: There are two sub-components to the Pre-Processing layer. They are the State Tracking Engine (STE) and the Metric Computation Engine (MCE).
   a. The STE runs natively on the FAR. Its responsibility is to keep track of the various characteristics (such as routing packets, DHCP packets, node join, parent change etc) of all the network elements that are visible to it (end points and the FAR itself). In an example implementation, all these states are stored in a file and periodically pushed to the MCE. The STE may be implemented in an existing thread and runs as a part of the same process that handles packet forwarding.
   b. The MCE may be implemented on the daughterboard, and may consist of a server that receives all the information from the STE over a TCP socket. All this information is then pushed into a database. The MCE also computes metrics and gathers the required data from the database using database APIs. These metrics are then consumed by the LM Algorithms that are running on the daughtercard. The MCE may be written as a standalone process that populates the database once it is received over the socket.

2. Orchestration Layer: This component is responsible for acting as the glue that joins the various components of the PPL and the LM module. It may be implemented on the FAR as a new thread and is a part of the same process as the STE. The OL creates two sockets, one that communicates with the LM module and the other with the MCE. The socket for LM is used to periodically communicate with the LM. The LM sends periodic requests over this socket based on which the OL can take actions. The MCE socket is used only for sending information from the STE to the MCE so that the database can be populated for the most up-to-date metrics.

3. Learning Machine Module: The LM module may be executed natively on a daughtercard of the FAR. The LM module is composed of the FC algorithm, which uses a library for random number generation and linear algebra operations. The FC algorithm illustratively maintains several instances of VBLS that are constantly fed with data computed by the MCE. At regular intervals, the FC algorithm evaluates the agreement of its candidate solutions for various nodes $n_i$ and subsequently sends requests for QoS probing to the Orchestration Layer through its dedicated socket.

Figure 12:
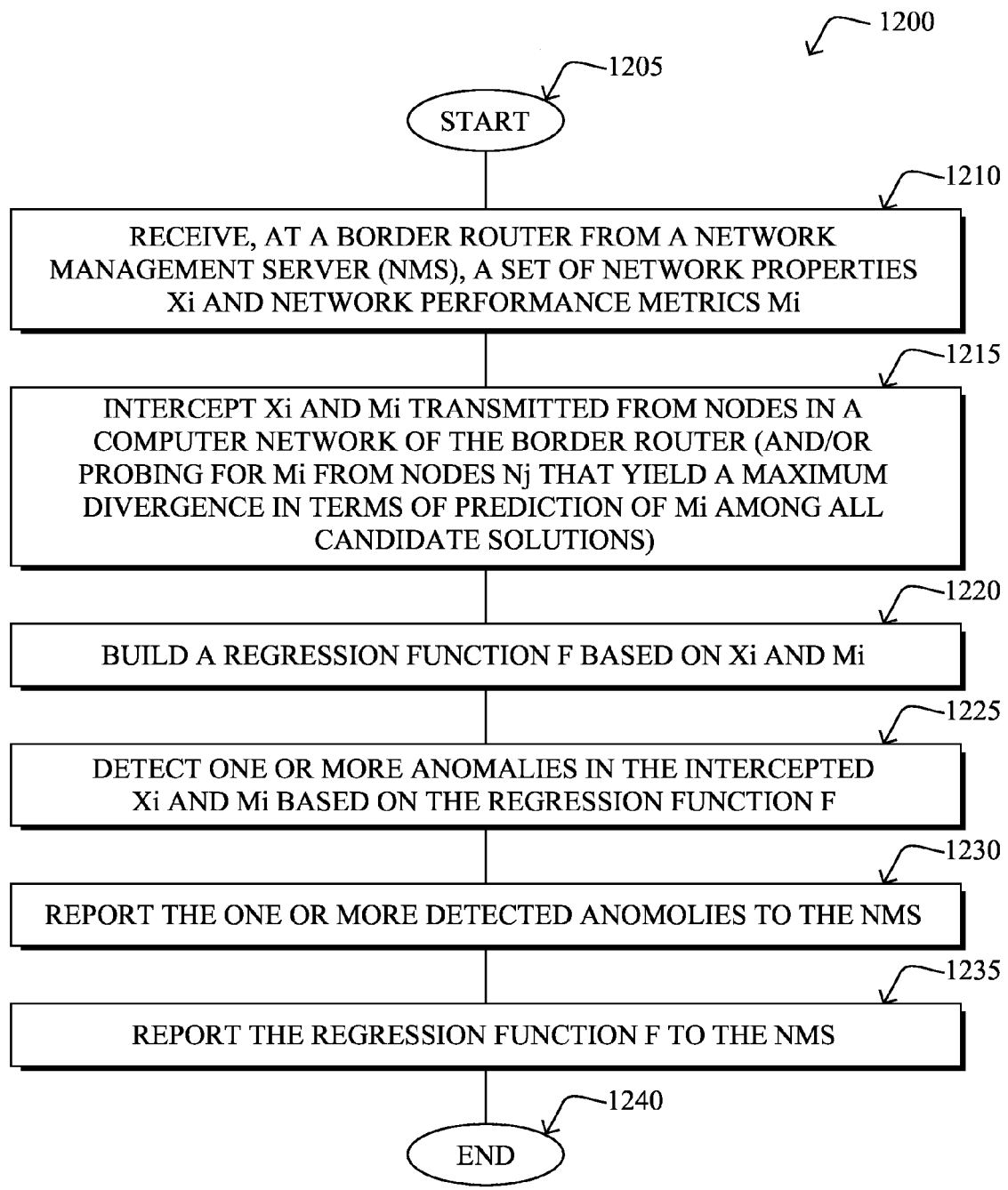
FIG. 12 illustrates an example simplified procedure for learning machine based detection of abnormal network performance in accordance with one or more embodiments described herein, particularly from the perspective of a border router.

FIG. 12 illustrates an example simplified procedure 1200 for learning machine based detection of abnormal network performance in accordance with one or more embodiments described herein, particularly from the perspective of a border router (learning machine, FAR, etc.). The procedure 1200 may start at step 1205, and continues to step 1210, where, as described in greater detail above, the border router receives, from a network management server (NMS), a set of network properties $x_i$ and network performance metrics $M_i$. Accordingly, in step 1215, the border router may then begin intercepting $x_i$ and $M_i$ transmitted from nodes in a computer network of the border router (and/or probing for $M_i$ from nodes $n_j$ that yield a maximum divergence in terms of prediction of $M_i$ among all candidate solutions), as described above. Based on $x_i$ and $M_i$, the border router may then build a regression function F in step 1220, and may use the regression function F to detect one or more anomalies in the intercepted $x_i$ and $M_i$ in step 1225 in a manner detailed above. Optionally, as mentioned above, the border router may report the one or more detected anomalies to the NMS in step 1230, and/or may report the regression function F to the NMS in step 1235. The procedure 1200 illustratively ends in step 1240, though notably with the option to receive updated $x_i$ and $M_i$, or to continue intercepting $x_i$ and $M_i$ and detecting anomalies.

Figure 13:
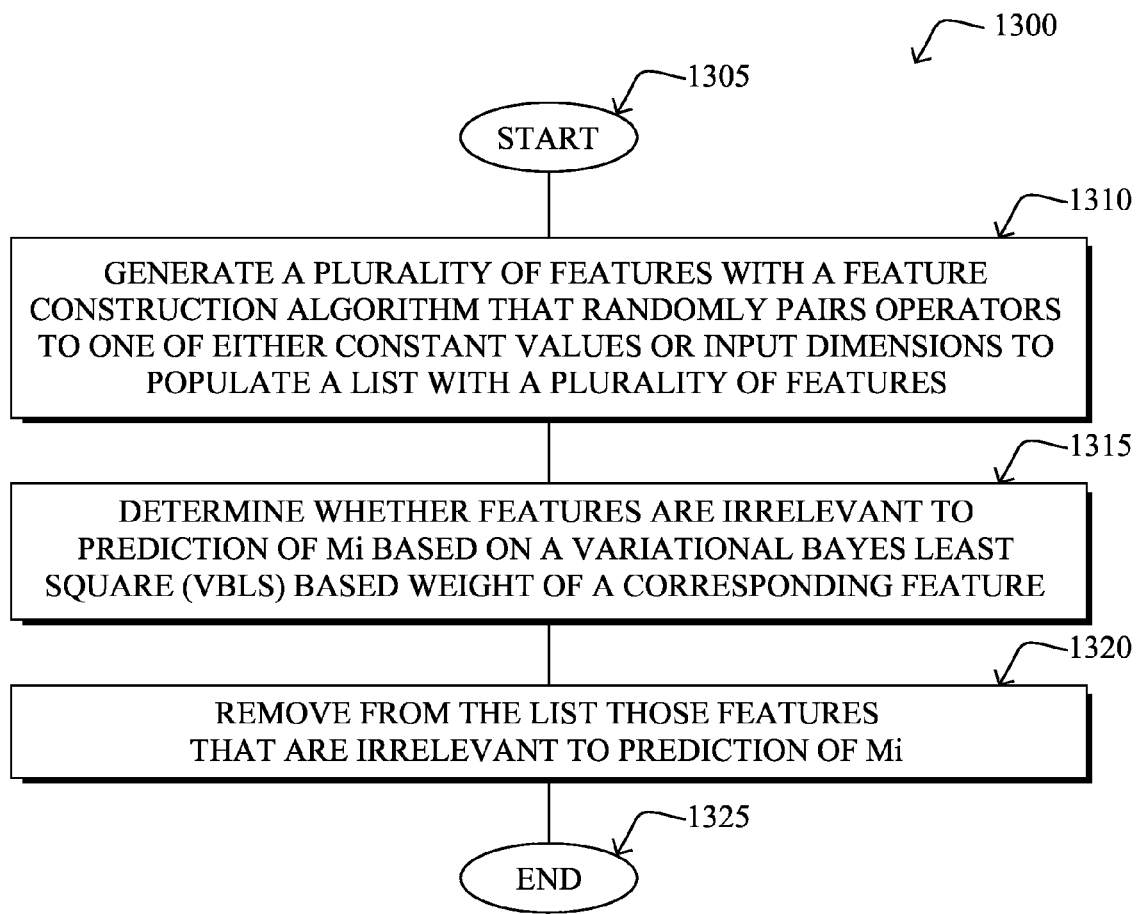
FIG. 13 illustrates an example simplified procedure for building a regression function and determining relevant features to use as input to the regression algorithm in accordance with one or more embodiments described herein.

Notably, FIG. 13 illustrates an example simplified procedure 1300 for building the regression function F and determining relevant features $f_j(x)$ to use as input to the regression algorithm (i.e., to determine a function F(x)) in accordance with one or more embodiments described herein. The procedure 1300 may start at step 1305, and continues to step 1310, where, as described in greater detail above, a plurality of features may be generated with a feature construction algorithm that randomly pairs operators to one of either constant values or input dimensions to populate a list with a plurality of features. By determining whether features are irrelevant to prediction of $M_i$ based on a VBLS-based weight of a corresponding feature in step 1315, those features that are irrelevant to prediction of $M_i$ may be removed from the list in step 1320. The illustrative procedure 1300 may then end in step 1225 (though notably able to continually update the set of relevant features, accordingly).

Figure 14:
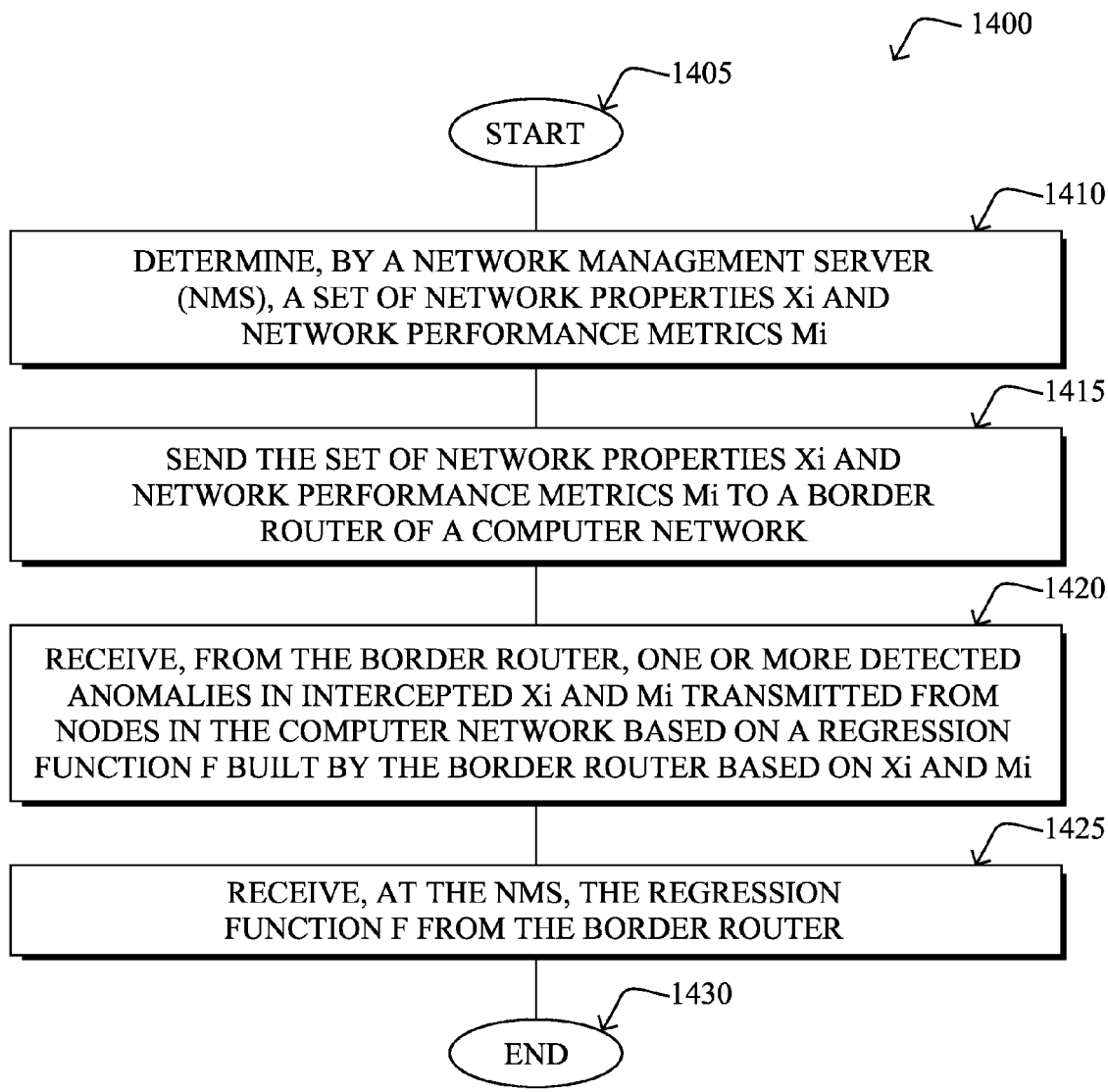
FIG. 14 illustrates an example simplified procedure for learning machine based detection of abnormal network performance in accordance with one or more embodiments described herein, particularly from the perspective of an network management server (NMS).

In addition, FIG. 14 illustrates an example simplified procedure 1400 for learning machine based detection of abnormal network performance in accordance with one or more embodiments described herein, particularly from the perspective of an network management server (NMS). The procedure 1400 may start at step 1405, and continues to step 1410, where, as described in greater detail above, the NMS determines a set of network properties $x_i$ and network performance metrics $M_i$, which may be sent to a border router of a computer network in step 1415. Accordingly, in step 1420, the NMS should receive, from the border router, one or more detected anomalies in intercepted $x_i$ and $M_i$ transmitted from nodes in the computer network based on a regression function F built by the border router based on $x_i$ and $M_i$, in a manner as detailed above. Optionally, as mentioned above, in step 1425 the NMS may also receive the regression function F from the border router. The procedure 1400 ends in step 1430, notably with the option to update $x_i$ and $M_i$, and/or to receive detected anomalies or updated regression functions.

It should be noted that while certain steps within procedures 1200-1400 may be optional as described above, the steps shown in FIGS. 12-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1400 are described separately, certain steps from each procedure may be incorporated into each other procedure, and the procedures are not meant to be mutually exclusive.

The techniques described herein, therefore, provide for learning machine based detection of abnormal network performance. In particular, the current approaches used to monitor, troubleshoot, and configure network performance require to retrieve a number of network properties leading to a vast amount of control traffic information that is simply not applicable to LLNs because of their constrained nature (e.g., large amount of devices, properties, limited bandwidth, etc.). According to the techniques herein, it becomes possible to build models of various network metrics and perform anomaly detection in a highly scalable fashion with very limited control plane traffic. Specifically, the techniques herein enable the FAR to perform predictive analytics of node metrics such as QoS or joining times, that is, it can predict the QoS of a node without probing it, thereby serving as an enabling technology for many other advanced features.

While there have been shown and described illustrative embodiments that provide for learning machine based detection of abnormal network performance, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a border router from a network management server (NMS), a message that includes a set of network properties $x_i$ and network performance metrics $M_i$, wherein the border router is executing one of a plurality of learning machines distributed across a plurality of boarder routers;
   intercepting, by the border router, $x_i$ and $M_i$ transmitted to the NMS from nodes in a computer network of the border router;
   building, by the border router, a regression function F based on $x_i$ and $M_i$;
   detecting, by the border router, one or more anomalies in the intercepted $x_i$ and $M_i$ based on the regression function F; and
   reporting the one or more detected anomalies to the NMS to cause the NMS to fix performance issues in the computer network.

2. The method as in claim 1, wherein the message is a IPv6 unicast message.

3. The method as in claim 1, further comprising:
   reporting the regression function F to the NMS.

4. The method as in claim 1, wherein building the regression function F comprises:
   determining relevant features $f_j(x)$ to use as input to a regression algorithm to determine a function $F(x)$.

5. The method as in claim 4, wherein determining relevant features $f_j(x)$ comprises:
   populating a list with a plurality of features; and
   removing from the list those features that are irrelevant to prediction of $M_i$.

6. The method as in claim 5, wherein populating comprises:
   generating a plurality of features with a feature construction algorithm that randomly pairs operators to one of either constant values or input dimensions.

7. The method as in claim 5, further comprising:
   determining whether features are irrelevant to prediction of $M_i$ based on a Variational Bayes Least Square (VBLS) based weight of a corresponding feature.

8. The method as in claim 1, further comprising:
   probing for $M_i$.

9. The method as in claim 8, wherein probing comprises:
   probing for $M_i$ from nodes $n_j$ that yield a maximum divergence in terms of prediction of $M_i$ among all candidate solutions.

10. A method, comprising:
    determining, by a network management server (NMS), a set of network properties $x_i$ and network performance metrics $M_i$;
    sending from the NMS, a message that includes the set of network properties $x_i$ and network performance metrics $M_i$ to a border router of a computer network, wherein the border router is executing one of a plurality of learning machines distributed across a plurality of boarder routers;
    receiving, from the border router, a report of the one or more detected anomalies in intercepted $x_i$ and $M_i$ transmitted to the NMS from nodes in the computer network based on a regression function F built by the border router based on $x_i$ and $M_i$; and
    fixing, by the NMS, performance issues in the computer network based on the one or more detected anomalies.

11. The method as in claim 10, further comprising:
    receiving, at the NMS, the regression function F from the border router.

12. An apparatus, comprising:
    one or more network interfaces to communicate as a border router with a computer network;

a processor coupled to the network interfaces and adapted to execute one or more processes; and a memory configured to store a process executable by the processor, the process when executed operable to:

receive, from a network management server (NMS), a message that includes a set of network properties $x_i$ and network performance metrics $M_i$, wherein the border router is executing one of a plurality of learning machines distributed across a plurality of boarder routers;

intercept $x_i$ and $M_i$ transmitted to the NMS from nodes in the computer network;

build a regression function F based on $x_i$ and $M_i$;

detect one or more anomalies in the intercepted $x_i$ and $M_i$ based on the regression function F; and report the one or more detected anomalies to the NMS to cause the NMS to fix performance issues in the computer network.

13. The apparatus as in claim 12, wherein the message is a IPv6 unicast message.

14. The apparatus as in claim 12, wherein the process when executed is further operable to:
report the regression function F to the NMS.

15. The apparatus as in claim 12, wherein the process when executed to build the regression function F is further operable to:
determine relevant features $f_j(x)$ to use as input to a regression algorithm to determine a function F(x).

16. The apparatus as in claim 15, wherein the process when executed to determine relevant features $f_j(x)$ is further operable to:
populate a list with a plurality of features; and
remove from the list those features that are irrelevant to prediction of $M_i$.

17. The apparatus as in claim 16, wherein the process when executed to populate is further operable to:
generate a plurality of features with a feature construction algorithm that randomly pairs operators to one of either constant values or input dimensions.

18. The apparatus as in claim 16, wherein the process when executed is further operable to:
determine whether features are irrelevant to prediction of $M_i$ based on a Variational Bayes Least Square (VBLS) based weight of a corresponding feature.

19. The apparatus as in claim 12, wherein the process when executed is further operable to:
probe for $M_i$.

20. The apparatus as in claim 19, wherein the process when executed to probe is further operable to:
probe for $M_i$ from nodes $n_j$ that yield a maximum divergence in terms of prediction of $M_i$ among all candidate solutions.

21. An apparatus, comprising:
one or more network interfaces to communicate as a network management server (NMS) with a border router of a computer network;

a processor coupled to the network interfaces and adapted to execute one or more processes; and a memory configured to store a process executable by the processor, the process when executed operable to:

determine a set of network properties $x_i$ and network performance metrics $M_i$;

send a message that includes the set of network properties $x_i$ and network performance metrics $M_i$ to a border router of a computer network, wherein the border router is executing one of a plurality of learning machines distributed across a plurality of boarder routers; and receive, from the border router, a report including one or more detected anomalies in intercepted $x_i$ and $M_i$ transmitted from nodes in the computer network based on a regression function F built by the border router based on $x_i$ and $M_i$; and fix performance issues in the computer network based on the report.

22. The apparatus as in claim 21, wherein the process when executed is further operable to:
receive the regression function F from the border router.

* * * * *